March 31, 1970  J. W. REEDS, JR  3,504,371
EVACUATABLE CHAMBER SEAL
Filed Dec. 18, 1967  2 Sheets-Sheet 2

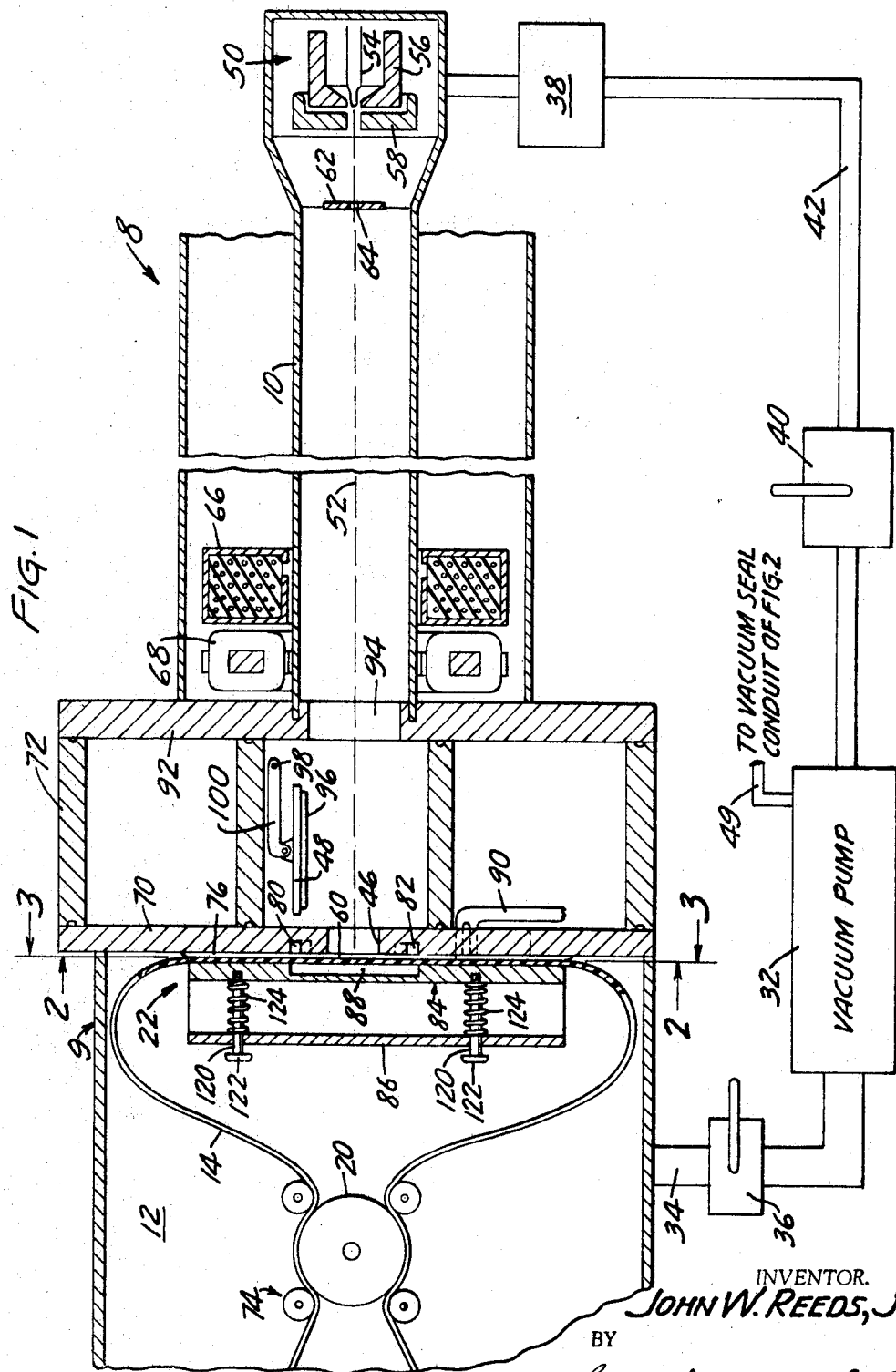

INVENTOR.
JOHN W. REEDS, JR.
BY
Carpenter, Kinney & Boulter
ATTORNEYS

United States Patent Office 3,504,371
Patented Mar. 31, 1970

3,504,371
EVACUATABLE CHAMBER SEAL
John W. Reeds, Jr., Thousand Oaks, Calif., assignor to Minnesota Mining and Manufacturing Company, St. Paul, Minn., a corporation of Delaware
Filed Dec. 18, 1967, Ser. No. 691,492
Int. Cl. G01d 9/42
U.S. Cl. 346—110                                       11 Claims

ABSTRACT OF THE DISCLOSURE

An electron beam recorder evacuatable chamber seal is shown for maintaining a seal between one end of a high vacuum treating chamber and a low vacuum chamber enclosing a flexible, elongated strip member having one surface which is to be treated in the high vacuum chamber wherein the end of the high vacuum treatment chamber is formed of a treating aperture, a pair of rails and a pair of elongated vacuum pumped slots which cooperate with and permit movement of the strip member between the chambers without damaging the one surface to be treated to position the one surface in the treating aperture for treatment in the high vacuum chamber.

---

Evacuatable chamber seals are well known in the art. Typical seals are disclosed in United States Patent Nos. 3,222,678 and 3,345,639, Jones application Ser. No. 667,016, now Patent No. 3,409,906, and Hoyne application Ser. No. 684,096.

Patent No. 3,345,639 discloses a film gate type of vacuum seal. In particular, Patent No. 3,345,639 discloses apparatus for forming a seal between one wall of an evacuatable gun chamber which wall forms an aperture plate having an aperture therethrough and which has a border therearound, and an ambient pressure external to the chamber. One surface of a flexible, elongated strip member passes across the aperture, cooperates with the border surrounding the aperture thereby forming a seal and is exposed through the aperture to the high vacuum within the evacuatable chamber.

The aperture plate has aperture rails and aperture lips which form the border around the aperture which cooperate with the strip member. A pressure shoe mating the aperture plate is positioned in opposed relation to the plate and has pressure rails formed on one surface thereof mating with and positioned in aligned opposed relation to the aperture rails. Means are provided for urging the pressure rails and the aperture rails toward each other. Thus a strip member disposed between the plate and the shoe is pressed at all times during operation into engagement with the aperture rails and consequently urged into sealing engagement with the aperture lips, covering the aperture and forming a seal between the evacuatable chamber and the ambient pressure surrounding the surface of the plate adjacent the strip member.

Each of the prior art evacuatable chamber seals have encountered one serious problem. The problem is that one surface of the strip member to be treated in the high vacuum chamber is sometimes damaged during advancement of the strip member through the seal. Typical damages include rubbing of the surface to be treated against sides of the plate defining the treating aperture.

Certain of the prior art seals, including those noted above, recognize this problem. Certain of the prior art seals include means for advancing the strip member through the seal while maintaining a spaced relationship between the surface of the strip member to be treated and the adjacent side of the seal. In this manner, an effective seal can be maintained by continual pumping of the thin space between the side of the seal and the one surface of the strip material.

The evacuatable chamber seal of the present invention relates to an improved evacuatable chamber seal similar to the seal disclosed in Patent No. 3,345,639. In one embodiment, the seal of the present invention is utilized as a seal between a low vacuum chamber enclosing a film transport system and a high vacuum chamber enclosing an electron gun. The low vacuum chamber is connected to a common wall of the high vacuum chamber. The high vacuum chamber wall has a treating aperture communicating with both chambers. The treating aperture includes spaced parallelly extending rails disposed on each side of the treating aperture and a pair of elongated slots extending transversely between the rails and disposed in spaced relation one on each side of the treating aperture. The elongated slots are vacuum pumped.

This seal differs markedly from that of Patent No. 3,345,639. In Patent No. 3,345,639, the aperture is surrounded by a border formed by a pair of aperture rails and aperture lips. The aperture rails and the aperture lips of Patent No. 3,345,639 normally slideably contact the surface of the strip member. In certain applications and with certain types of electron sensitive media, the surface to be treated becomes scratched, marred or otherwise damaged. While this is not detrimental to normal operation, high quality recording of information requires that the surface of the strip member be relatively free from damage. In Patent No. 3,345,639, the height of the aperture lips could be slightly reduced to permit a loose but sealing contact between the border around the aperture and the surface of the strip member. In any event, the presence of a border, formed by aperture lips, caused surface damage.

The present invention overcomes the disadvantages of the prior art including those of Patent No. 3,345,639 by completely eliminating the presence of a border around the aperture by eliminating the necessity of using aperture lips to form a seal. In particular, the opposite edges of the one surface of the strip member to be treated are forced into intimate slideable contact with the parallelly extending rails. The elongated slots are vacuum pumped and are capable of continually maintaining a high negative pressure at the treating aperture by removing gases between the rails moving along the one surface as the strip member is advanced across the treating aperture and elongated slots.

One advantage of the present invention is that a strip member can be advanced through an evacuatable chamber seal without damaging the surface of the strip member.

Another advantage of the evacuatable chamber seal of the present invention is that the strip member can be tensioned around and advanced over an arcuate shaped terminus or end wall of a high vacuum chamber.

Yet another advantage of the present invention is that a spring loaded back plate can be utilized for urging a strip member into intimate slideable contact with rails on the end wall of a high vacuum chamber. Briefly, this invention relates to a novel combination having utility as an electron beam recorder evacuatable chamber seal. The combination includes a strip member having one surface which is to be treated in a vacuum. An evacuatable chamber has at one end an apertured member joined thereto. The apertured member has a treating aperture formed therein communicating directly between the chamber and the outer surface of the apertured member. The apertured member also includes spaced parallelly extending rails formed on the outer surface of the member and disposed adjacent opposite ends of the treating aperture. The apertured member further includes a pair of elongated slots extending transversely between said rails and disposed in spaced relation one on each side of said treating aperture. The rails are adapted to slideably engage opposite edges of the one surface when the strip member is positioned across the treating aperture and the elongated slots. The combination further includes means operatively coupled to the strip member and disposed relative to the apertured member for advancing the strip member in a longitudinal direction along the rails and across the treating aperture and the elongated slots enabling the one surface of the strip member to be treated in the vacuum at the treating aperture. The combination further includes means operatively coupled to the strip member for forcing the edges of the one surface into intimate slideable engagement with the rails to hold the strip member tightly thereagainst. A vacuum pumping means is provided which is operatively coupled to the treating chamber for forming a high negative pressure at the treating aperture and which is connected to the elongated slots for forming a lower negative pressure around the treating aperture. The elongated slots are capable of continually maintaining the high negative pressure at the treating aperture by removing gases between the rails which move along the one surface as the strip member is advanced across the treating aperture and the elongated slots.

These and other advantages of the present invention will become readily apparent when considered in light of the following description of two embodiments taken together with the accompanying drawing wherein:

FIGURE 1 is a fragmentary diagrammatic view partially in cross-section of an electron beam recorder incorporating the improved evacuatable chamber seal of the present invention;

Figure 4:
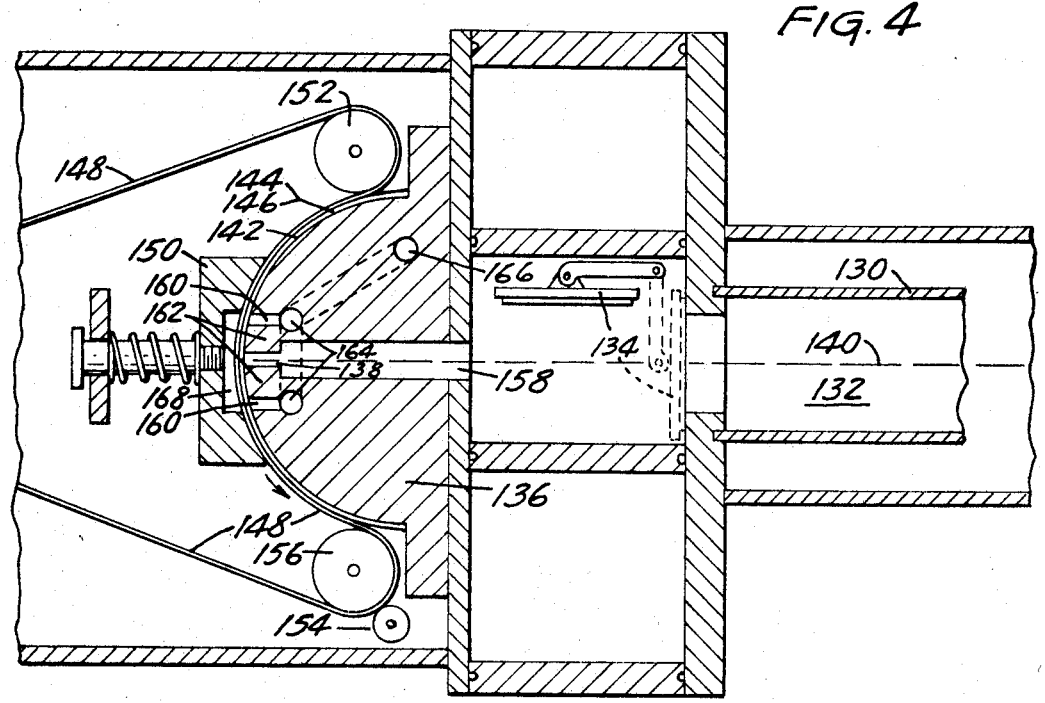
FIGURE 4 is a pictorial representation of another embodiment of an electron beam recorder incorporating the teachings of the present invention.

FIGURE 1 illustrates an electron beam recorder employing the evacuatable chamber seal of the present invention. Briefly, the recorder comprises a high vacuum section 8 and a low vacuum section 9 enclosing a film chamber 12. The film chamber 12 encloses transport means for an electron beam sensitive media, such as an electron sensitive photographic film 14, which includes a supply reel (not shown) rotatably mounted by a spindle in a normal manner within the film chamber 12. Further, the film chamber 12 includes a take-up reel (not shown) which is also rotatably mounted on a driven spindle within the chamber 12.

It is contemplated that the supply and take-up reels could be mounted coaxially. In such an arrangement, the necessary idler rollers can be added to transport means for guiding the strip member, such as film, from the supply reel, through the recorder and back to the coaxially mounted take-up reel. Also, in such a coaxially mounted arrangement, the supply and take-up reels can be enclosed in a cartridge arrangement for convenient loading and unloading.

A sprocket film drive capstan 20 operates to form buffer tape loops in the vicinity of a film gate 22. The supply reel, the take-up reel and the sprocket film drive capstan 20 may be driven from a suitable motor or independent motors (not shown). The path for the film 14 directs the same past a treating aperture 46. The detail of the film gate 22 and the treating aperture 46 are described hereinafter.

In FIGURE 1, a mechanical fore pump 32 is connected to chamber 12 through a vacuum line 34 and a film chamber valve 36. Additionally, the fore pump 32 is connected to a diffusion pump 38 through a vacuum valve 40 and a vacuum line 42. The diffusion pump 38 is directly connected to the electron gun chamber 10. A flap valve 48 is located within a high vacuum gun chamber 10 at the end thereof adjacent the aperture 46. By operation of the valves 36, 40 and 48 in proper sequence, the electron gun chamber 10 can be kept at high vacuum during loading, exhaust and unloading operations taking place in the chamber 12. By using such a vacuum system, the high vacuum within the electron gun chamber can be maintained, for example, at about $10^{-5}$ to $10^{-7}$ millimeters (mm.) of mercury (Hg) or torr which maintains a negative pressure in the order of $10^{-3}$ to $10^{-4}$ torr in the aperture end of the high vacuum chamber. The lower vacuum in film chamber 12 can be maintained during operation at vacuum lower than that of the high vacuum, for example, at about 15 to 20 torr. Additionally, the vacuum pump 32 includes a conduit 49 which is connected to the apertured member for supplying a low negative pressure of about 1 torr to be evacuatable chamber seal. It is contemplated that the vacuum pump 32 includes the necessary vacuum regulators for maintaining the desired negative pressures. It is apparent that other combinations of pumps and valves could be used to provide the necessary vacuum in each vacuum chamber. Similarly, the vacuums of each chamber could be varied widely from these given depending on type of operation or application being carried out.

FIGURE 1 diagrammatically illustrates a simple triode type electron gun 50 housed in the high vacuum electron gun chamber 10. The gun 50 produces and directs an electron beam 52 along a predetermined path through the treating aperture 46 to bombard the portion of film 14 in register therewith to impart information thereto in the form of images, etc. A triode type electron gun designed in accordance with the parameters set forth in a book entitled "Electron Optics" by O. Klemperer, published in 1953, is illustrative of an electron gun suitable for use in this invention.

The triode gun illustrated herein employs a sharp hairpin tungsten filament cathode 54 to produce an electron beam. A grid 56 is interposed between an anode 58 and the filament cathode 54. The filament cathode 54 and the grid 56 may be operated at about 18,000 volts negative potential. The anode 58, the film chamber 12 and the film 14 are maintained at ground potential. The electrons from filament cathode 54, which is at a high negative potential, are accelerated by anode 58 to bombard one surface 60 of the film 14 which is at ground potential. An aperture disk 62 having an aperture 64 therein, with a diameter in the order of .010 inch (0.25 mm.), is located after the anode 58. The aperture disk 62 limits the cross-sectional spot size of the electron beam to reduce spherical aberration and directs said beam along a predetermined path to impinge on the film.

The electron beam 52 can be modulated by applying a varying video signal to the grid 56. The electron beam 52 is focused to a small size beam spot by an electromagnetic focusing lens 66 and said beam is deflected in a scan pattern by a deflecting yoke 68.

One type of recording medium or electron sensitive medium capable of use with this recorder is a silver halide emulsion photographic film, for example Ferrania positive type 15 film. Film having a high resistivity of about $10^8$ ohms per square or greater is desirable.

In FIGURE 1, the chamber 10 has an apertured member 70 connected at one side to the cylindrical portion of the chamber 10 by a suitable hermetic seal. The other side of apertured member 70 is joined in sealing engagement to the chamber 12. The apertured member 70 encloses an aperture housing 72 which is tubular and rectangular in section and which forms a part of said apertured member 70. Apertured member 70 forms the common end wall of the chambers 10 and 12 and has the aperture 46 formed therein communicating between the two chambers. One face of the apertured member 70 is constructed to form an outer surface which cooperates with the film gate 22 and film transport means, generally designated as 74, for advancing the strip member.

The film gate 22 includes, as one embodiment of a seal, an apertured member 70 of the high vacuum chamber 10 whose end wall defines the treating aperture 46. The outer surface of apertured member 70 includes parallelly extending rails, designated as 76 and 78, and elongated vacuum pumped slots, designated as 80 and 82, extending transversely between the rails 76 and 78.

A pressure shoe 84 is included for urging the film 14 against the rails 76 and 78 adjacent the treating aperture 46 and a shoe support means 86. In this embodiment, the pressure shoe 84 is a planar member having a relatively shallow hollowed-out area forming a recess located just behind and in opposed relation to the treating aperture 46. In this embodiment, the hollowed-out area or recess 88 of the pressure shoe 84 is pumped to the same low negative pressure as the elongated slots 80 and 82 and by the same vacuum source serving the slots. This is accomplished by using a perforated film and aligning the perforated portions of the film with provided slots. This is illustrated and discussed in greater detail in the following discussion of FIGURES 2 and 3.

In any event, a vacuum seal is formed between one side 60 of film 14 and the vacuum pumping of the elongated slots 80 and 82 between rails 76 and 78 which are adjacent the treating aperture 46 in the apertured member 70. A claw 90, driven by suitable cam means (not shown), advances the film 14 incrementally through the film gate 22.

A second spaced inner wall member 92 is joined to chamber 10 and is spaced from the apertured member 70. The inner wall member 92 has an opening 94 formed therein aligned with the axis of cylindrical chamber 10, which opening 94 is also aligned with treating aperture 46. The flap valve 48, having an O-ring 96 disposed on its face, is mounted by means of a shaft 98 and crank arm 100 for movement between an open and closed position in relation to the opening 94. In closed position the valve 48 and O-ring 96 form a seal around the sides of opening 94. When reloading the film transport 74 with a new film 14, the vacuum seal occurring between the one side 60 of film 14 and the sides of the aperture 46 is disabled. Thus, when chamber 12 is opened, for example during reloading of film 14, flap valve 48 can be closed to maintain the high vacuum in chamber 10 and reduce the time required to place the recorder back in operation.

Now that the overall operation of a typical electron beam recorder incorporating the teachings of the present invention has been described, the detail construction of the evacuatable chamber seal will now be considered.

Figure 2:
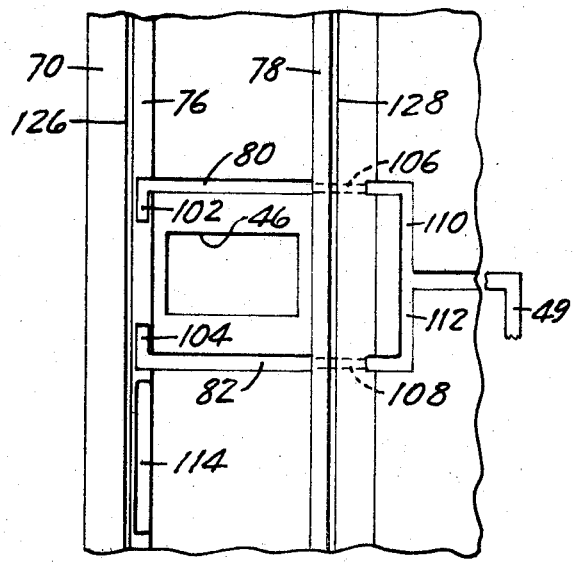
FIGURE 2 is a fragmentary detail view taken along line 2—2 of FIGURE 1.

FIGURE 2 illustrates the outer wall of apertured member 70, the rails 76 and 78 and the elongated slots 80 and 82 adjacent the treating aperture 46 as viewed from the low film chamber side. In this embodiment, a pair of parallelly extending raised rails 76 and 78 are disposed in parallel transversely spaced relationship along the outer surface of apertured member 70 and adjacent each of the ends of the aperture 46. The aperture rails 76 and 78 are disposed so as to be in intimate slideable contact with the opposite elongated edges of the flexible strip member or film 14. The aperture rails 76 and 78 extend in a forward and trailing direction beyond the aperture relative to the direction of film movement.

Thus, in this embodiment, the outer surface of apertured member 70 defines a linear path which extends lengthwise in the direction of movement of the strip member.

If desired, the film 14 may have a sound track recorded longitudinally along one edge thereof such as, for example, along the edge which contacts rail 78. The rail 78 may be recessed in the center thereof forming two relatively thin rails. The sound track would then pass undamaged through the seal in the same manner as the one side 60 of the film 14 passes through the seal.

The elongated slots 80 and 82 are positioned one on each of the other two sides of the aperture 46 and extend transversely between the aperture rails 76 and 78. Each elongated slot 80 and 82 is L-shaped having additional slots or short slots 102 and 104 respectively which extend into and terminate in the same rail 76. The short slots 102 and 104 are spaced apart from each other, but are of sufficient length to simultaneously communicate with perforations in the film 14.

In order to provide a negative pressure to the elongated slots 80 and 82, the outer surface of apertured member 70 has two holes 106 and 108 formed therein through the side thereof. Vacuum lines 110 and 112 are connected to holes 106 and 108 respectively. The vacuum lines 110 and 112 are connected to a common conduit 49 of FIGURE 1, which conduit 49 is in turn connected to the vacuum pump 32. When the opposite edges of the film 14 are urged into intimate slideable contact with rails 76 and 78, the elongated slots 80 and 82 are capable of removing gas molecules located between the rails 76 and 78 which move along with the strip member. Even though the film 14 is normally transported or advanced in one direction, the elongated slots 80 and 82 are capable of maintaining the high negative pressure at the treating aperture 46 located only a short distance away.

When the film 14 is positioned in the treating aperture 46, the low negative pressure in each elongated slot 80 and 82 is applied via the perforations in the film 14 into the thin hollowed-out area or recess behind the film 14 located in the pressure shoe 84. In this way, low negative pressures can be provided on each side of the film 14 during imaging by the electron beam. The equalized pressure is in the slots 80 and 82 and recess 88 located on the opposite surfaces of the film 14. This equalized pressure in the vicinity of the treating aperture 46 permits the use of extremely thin films since the film does not buckle or bend into the aperture 46 during imaging. Conversely, if a stiffer film is used, the pressure shoe 84 could be eliminated and the film 14 could be held in tension against the outer surface of apertured member 70 and particularly against the rails 76 and 78. A claw opening 114 is disposed in the rail 76 in spaced relation to the aperture 46 to permit claw 90 to project therethrough to engage perforations into and advance the film 14.

Figure 3:
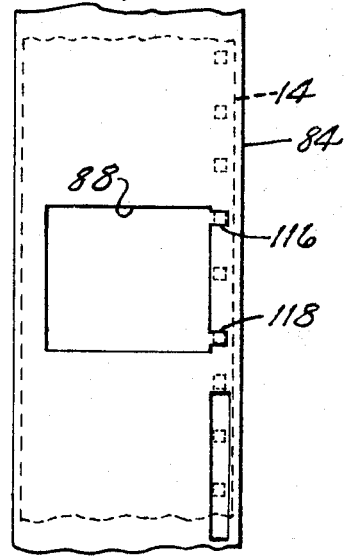
FIGURE 3 is a fragmentary detail view taken along line 3—3 of FIGURE 1.

FIGURE 3 is a detail view taken along line 3—3 in FIGURE 1. FIGURE 3 illustrates the face of pressure shoe 84 which is positioned parallel to the apertured member 70 to engage the back side of the strip member or film 14 within the low vacuum film chamber 12. In this embodiment, the pressure shoe 84 is a flat or planar member which has the thin hollowed-out area or shallow recess 88 formed therein. The shallow recess 88 has two hollowed-out tabs 116 and 118 which, when the seal is assembled, are physically positioned in opposed spaced alignment with the short slots 102 and 104 of elongated slots 80 and 82 respectively. When the film 14 (illustrated as a dashed line herein for clarity) is aligned such that its perforations are in alignment between short slots 102 and 104 and hollowed-out tabs 116 and 118, the entire area is pumped to a low negative pressure by vacuum pump 32 via conduit 49 and vacuum lines 110 and 112.

Referring back to FIGURE 1, the pressure shoe 84 illustrated in FIGURE 3 is supported by the pressure shoe support 86. The pressure shoe 84 is mounted by two guide rods 120 to the support 86. The guide rods 120 have one end solidly connected to the pressure shoe 84 with the other end thereof slideably fitted through openings in the pressure shoe support 86 and terminating with collars or heads 122. Springs 124 are disposed around the periphery of the guide rods 120 between the pressure shoe 84 and the pressure shoe support 86. The springs 124 urge the pressure shoe 84 away from the pressure shoe support 86 such that its flat or planar surface contacts the back side of the film 14 and urges the opposed edges of the film into slideable contact with the rails 76 and 78.

The apertured member 70 is also formed with means for guiding the film 14. In FIGURE 3, the guide means engages the longitudinal edges of the film 14 and is illustrated as longitudinally extending edges 126 and 128 which project above the plane of the rails 76 and 78 on the apertured member 70.

In the electron beam recorder illustrated in FIGURE 1 using the detail structure of the seal is illustrated in FIGURES 2 and 3, the film was only intermittently advanced. In one application, the recorder is used to convert and record 30 video television frames per second on film at the rate of 24 film frames per second. In this use, the film 14 was stationary approximately 80 percent of the time and moved only 20 percent of the time. The static dwell time of 80 percent worked extremely well in maintaining a low negative pressure in the order of 1 torr through the film 14 perforation and on the reverse side of the film. By maintaining a pressure of about 1 torr in the elongated slots 80 and 82, a pressure of about $10^{-1}$ torr is maintained at the treating aperture 46.

Typically, when the height of the rails 76 and 78 on the outer surface of apertured member 70 varies between .002 inch (.05 mm.) and .010 inch (.25 mm.) and preferably around .005 inch (.12 mm.), the one surface 60 of the film 14 or strip member did not contact the outer surface of apertured member 70 between the rails 76 and 78. The aperture 46 is of a size corresponding generally to the size of an image frame on a film such as frame on a 16 mm. film.

If it is desired to use rails having a larger height, it is readily apparent that the width of the elongated slots 80 and 82 would need to be increased and the magnitude of the negative pressure increased. Alternately, the hollowed-out area or recess 88 in pressure shoe 84 could have its own separate vacuum line if necessary. Also, by forming the end wall into a curved surface and tensioning the film 14 thereagainst, an effective seal can be maintained. If the film is sufficiently rigid and the height of the rails is properly selected, the pressure shoe 84 can be eliminated in that the back side vacuum in the vicinity of the treating aperture 46 is unnecessary. Thus, the means for forcing the strip member into engagement with rails 76 and 78 is intended to cover both the means for tensioning the longitudinal edges of the strip member against the rails 76 and 78 and means for urging the longitudinal edges of the strip member into engagement with the rails 76 and 78. When utilizing a means for urging the longitudinal edges of the strip member against the rails, in the preferred embodiment, the outer surfaces of the rails on the apertured member and the opposed mating surfaces of said pressure shoe are generally planar when utilizing the embodiment of FIGURE 1. If the apertured member is curved, then the outer surface of said rails on said apertured member and the opposed mating surface of the pressure shoe are arcuate and concentric.

FIGURE 4 is a pictorial representation of an electron beam recorder having an arcuate shaped aperture member from the high vacuum chamber and a curved mating pressure shoe. In this embodiment, the arcuate shaped outer surface is curved in the direction of movement of the strip member.

An end 130 of an electron gun chamber 132 which houses an electron gun similar to that of FIGURE 1 is illustrated. The electron gun chamber end 130 has a flap valve 134 which is substantially the same as flap valve 48 of FIGURE 1.

The chamber end 130 terminates in an aperture member 136 having a treating aperture 138 formed therein through which an electron beam 140 is directed. An outer surface 142 of apertured member 136 forms an outer terminal wall portion which in this embodiment is a curved or arcuate shaped end wall. The outer surface 142 has parallelly extending rails 144 and 146 formed on the surface thereof. The outer surface 142 with the rails 144 and 146 defines a surface around which the strip member 148 travels as it is passed to and through the aperture 138 and is exposed to the chamber 132 for bombardment of one surface thereof by the electron beam 140. It is contemplated that apertured member 136 and aperture 138 could be located in other than axial alignment with the electron gun chamber 132, such as for example at a 90° angle. In such an apparatus, the electron beam 140 is deflected through a 90° angle by conventional beam deflection means.

A source of reduced pressure or means for producing at least a partial vacuum, such as a vacuum pump (not shown), maintains the desired vacuum in chamber 132, and subatmospheric pressure in the vicinity of the apertured member 136.

A complementary shaped pressure shoe 150 is positioned adjacent the outer surface 142 and apertured member 136 and is mounted to be readily removed and replaced to facilitate threading the film 148 into the apparatus. The pressure shoe 150 also coacts with the apertured member 136 to maintain the film 148 in its path and under desired pressure conditions. The film 148 in the illustrated embodiments is a medium sensitive to an electron beam, for example a film or treated paper. The film 148 is progressively unwound from a supply roll (not shown) over a roller 152 and between the apertured member 136 and pressure shoe 150. The film 148 is threaded between a driven capstan 154 and a resilient pressure roller 156 which coacts with the capstan 154 to maintain the film 148 in frictional contacting driving engagement therebetween. During a recording operation, the capstan 154 is adapted to drive the film 148 at a constant speed and the film 148 is rewound upon a take-up spool (not shown).

The outer surface 142 of apertured member 136 having the parallelly extending rails 144 and 146 provides a predetermined path over which the film 148 may be passed as indicated by the arrow in FIGURE 4 without wrinkling. The outer surface 142 is arcuate in the lengthwise direction of the film and has a straight dimension in the transverse or widthwise direction of the film. The aperture 138 is positioned intermediate the ends of outer surface 142 and communicates directly with a thin chamber 158 in the apertured member 136. The arcuate surface 142 of apertured member 136 has a groove 160 disposed therein which surrounds the aperture 138. A surface portion or land 162 remaining between the groove 160 and the aperture 138 forms an annular slot around the aperture 138.

The slots adjacent the edges of the aperture 138 may be other than elongated slots, such as for example the annular groove 160. Thus, the means defining slots in the outer surface of the apertured member have portions of the slots which are disposed generally transversely between the rails and in adjacent spaced relation to opposite edges of the treating aperture. A suitable passage 164 is formed in the apertured member 136 and is connected to the vacuum pumping means via opening 166 such that the groove 160 is pumped to a subatmospheric pressure to draw at least a partial vacuum in the groove 160.

The pressure shoe 150 is formed with a generally rectangular dished-out cavity or shallow recess 168 generally centrally thereof. The recess 168 has a transverse dimension equal to the transverse length of the groove 160. The recess 168 communicates through the end portions of the groove 160 with the source of subatmospheric pressure to which the passage 164 is connected such that the pressure in the recess 168 is substantially identical to the pressure in the groove 160 during operation of the apparatus.

The groove 160 forms areas of reduced pressure at the surface of the apertured member 136 forwardly and rearwardly of the aperture 138, in the direction of movement of the film 148, such that any gas molecules trapped between the film and between the rails 144 and 146 of the outer surface 142 of the apertured member 136 are drawn away before the web crosses the aperture 138. These areas of at least a partial vacuum serve to prevent any gas from being carried into the chamber 158 and thus form at least a partial seal between the treatment chamber and the atmosphere. In this embodiment, the longitudinal edges of film 148 are in intimate slideable engagement with the rails 144 and 146 and are spaced from contacting the land 162 around aperture 138. In this manner, the surface of the film 148 to be imaged by the electron beam 140 is not damaged as it is transported through the seal.

It is apparent that many modifications, improvements and the like of the present invention can be made and all are deemed within the scope of the invention.

What is claimed is:

1. An evacuatable chamber seal for sealing between two evacuatable chambers without contacting the sensitive area of a strip member to be treated, said chamber seal comprising:
  (a) a first housing enclosing a high vacuum chamber, said first housing including a first wall, said first wall including an outer surface and a treating aperture;
  (b) a second housing secured to said first housing and enclosing a low vacuum chamber wherein said treating aperture communicates between said high vacuum chamber and said low vacuum chamber and said outer surface is located within said low vacuum chamber;
  (c) two laterally spaced and parallel extending rails secured to said outer surface and located on opposite sides of said treating aperture, said rails and said outer surface defining a channel therebetween, said channel extending a substantial distance on opposite sides of said treating aperture;
  (d) a strip member having a substantially centralized area sensitive to treatment, said strip member positioned on said rails to locate said area over said channel and said treating aperture, said strip member in supporting engagement with said rails for a distance less than the channel distance to thus prevent contact between said outer surface and said area;
  (e) means operatively coupled to said strip member for forcing said strip member into intimate slideable contact with said rails;
  (f) two slots within said outer surface extending substantially between said rails and located on opposite sides of said treating aperture; and
  (g) vacuum pumping means operatively connected to
    (1) said high vacuum chamber for forming a high negative pressure at said treating aperture,
    (2) said low vacuum chamber for forming a low negative pressure therein,
    (3) said slots for removing gases within said channel and thus continually seal the high negative pressure at said treating aperture from said low negative pressure while said strip member is positioned on said rails.

2. The combination of claim 1 wherein the surface areas of said rails in slideable contact with said strip members are substantially coplaner.

3. The combination of claim 1 wherein said rails are arcuately shaped and thus curved in the direction of movement of the strip member and said means for forcing said strip member into intimate slideable contact with said rail includes means for tensioning said strip member across said arcuately shaped rails.

4. The combination of claim 1 wherein said forcing means includes
  a pressure shoe positioned in opposed relationship relative to said rails and including a surface for mating with the surface areas of said rails and in slideable contact with said strip member; and
  means for urging said pressure shoe toward said rails to press the opposite longitudinal edges of said strip member into intimate slideable contact with said rails.

5. The combination of claim 4 wherein said pressure shoe has
  a shallow recess formed therein which is located in an opposed relation to said aperture; and
  means for establishing a low negative pressure in said recess.

6. The combination of claim 5 wherein said means for establishing said low negative pressure in said recess includes
  additional portions of said slots formed in one of said rails and in opposed relation to hollowed-out tabs on said pressure shoe, which tabs communicate with said recess and with said additional portions of said slots when perforations of a strip member are positioned in alignment between said additional portions and said tabs forming a path through a said strip member to evacuate said recess to substantially the same negative pressure as said slots.

7. The combination of claim 4 wherein the outer surfaces of said rails on said apertured member and the opposed mating surfaces of said pressure shoe are generally planar.

8. The combination of claim 4 wherein said outer surface of said rails on said apertured member and the opposed mating surfaces of said pressure shoe are arcuate and concentric.

9. A recording apparatus for imparting information directly on a recording medium by an electron beam and in combination with an evacuatable chamber seal for sealing between two evacuatable chambers without contacting the electron sensitive area of a recording medium strip member to be electronically treated, said combination comprising:
  (a) a first housing enclosing a high vacuum chamber, said first housing including a first wall, said first wall including an outer surface and a treating aperture;
  (b) means within said first housing for generating and directing an electron beam through said treating aperture;
  (c) a second housing secured to said first housing and enclosing a low vacuum chamber wherein said treating aperture communicates between said high vacuum chamber and said low vaccum chamber and said outer surface is located within said low vacuum chamber;
  (d) two laterally spaced and parallel extending rails secured to said outer surface and located on opposite sides of said treating aperture, said rails and said outer surface defining a channel therebetween, said channel extending a substantial distance on opposite sides of said treating aperture;
  (e) a strip member having a substantially centralized area sensitive to electron bombardment from said electron beam, said strip member positioned on said rails to locate said area over said channel and said treating aperture, said strip member in supporting engagement with said rails for a distance less than the channel distance to thus prevent contact between said outer surface and said area;
  (f) means operatively coupled to said strip member for forcing said strip member into intimate slidable contact with said rails;
  (g) two slots within said outer surface extending substantially between said rails and located on opposite sides of said treating aperture; and
  (h) vacuum pumping means operatively connected to
    (1) said high vacuum chamber for forming a high negative pressure at said treating aperture,
    (2) said low vacuum chamber for forming a low negative pressure therein,
    (3) said slots for removing gases within said channel and thus continually seal the high negative pressure at said treating aperture from said low negative pressure while said strip member is positioned on said rails.

10. A recording apparatus and evacuatable chamber seal as defined in claim 9, said combination comprising:
means within said second housing for advancing said strip member across said treating aperture to permit additional exposure of said strip member, and wherein said evacuatable chamber seal maintains a seal between said high vacuum chamber and said low vacuum chamber during said advancing of said strip member.

11. The recording apparatus of claim 9 wherein said forcing means includes
a pressure shoe having an outer surface for mating with the outer surface of said means defining said rails and elongated slots, said pressure shoe having a recess formed therein which recess, when said pressure shoe is located in an opposed relation to said means defining said rails and elongated slots, is located in opposed relation to said elongated slots and said treating aperture; and
means for establishing negative pressure in said recess which is substantially equal to the negative pressure in said elongated slots.

References Cited

UNITED STATES PATENTS

| | | | |
|---|---|---|---|
| 3,205,301 | 9/1965 | Etcheverry | 178—6.6 |
| 3,222,678 | 12/1965 | Jones | 346—110 X |
| 3,341,728 | 9/1967 | Fotland | 346—74 X |
| 3,345,639 | 10/1967 | Dubbe | 346—110 |
| 3,409,906 | 11/1968 | Jones | 346—110 |

JOSEPH W. HARTARY, Primary Examiner

U.S. Cl. X.R.

178—6.7; 346—74